United States Patent
Liu (10) Patent No.: US 9,735,855 B2
(45) Date of Patent: Aug. 15, 2017

(54) METHOD AND APPARATUS FOR RELAYING COMMUNICATION BETWEEN AN ACCESS POINT AND A STATION IN A WIRELESS NETWORK

(71) Applicant: Marvell World Trade Ltd., St. Michael (BB)

(72) Inventor: Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 228 days.

(21) Appl. No.: 13/905,847

(22) Filed: May 30, 2013

(65) Prior Publication Data

US 2013/0329627 A1    Dec. 12, 2013

Related U.S. Application Data (60) Provisional application No. 61/657,643, filed on Jun. 8, 2012.

(51) Int. Cl.
*H04L 12/28*    (2006.01)
*H04B 7/15*    (2006.01)
(Continued)

(52) U.S. Cl.
CPC .............. *H04B 7/15* (2013.01); *H04W 74/04* (2013.01); *H04W 84/047* (2013.01)

(58) Field of Classification Search
CPC ... H04W 84/047; H04W 48/20; H04W 88/04; H04W 84/12; H04W 74/06; H04W 74/04;
(Continued)

(56) References Cited

U.S. PATENT DOCUMENTS 7,599,332 B2    10/2009 Zelst et al.
7,664,089 B2    2/2010 Zhao
(Continued)

FOREIGN PATENT DOCUMENTS

EP    1513295 A2    3/2005
EP    1553730 A1    7/2005
(Continued)

OTHER PUBLICATIONS de Vegt, "Potential Compromise for 802.11ah Use Case Document," The Institute of Electrical and Electronics Engineers,Inc., doc. No. IEEE 802.11-11/0457r0, 27 pages, (Mar. 2011).
(Continued)

*Primary Examiner* — Shaq Taha
*Assistant Examiner* — Lionel Preval (57) ABSTRACT

A network including an access point, a client station, and a proxy station. The proxy station is configured to communicate with the access point during a first period. During the first period the proxy station is configured to receive, from the access point, downlink data intended for the client station, and transmit, to the access point, uplink data received from the client station and intended for the access point. The proxy station is further configured to communicate with the client station during a second period. During the second period the proxy station is configured to receive, from the client station, the uplink data intended for the access point, and transmit, to the client station, the downlink data intended for the client station.

18 Claims, 5 Drawing Sheets

(51) Int. Cl.
*H04W 74/04* (2009.01)
*H04W 84/04* (2009.01)

(58) Field of Classification Search
CPC ........ H04W 74/0808; H04W 74/0816; H04W 92/20; H04B 7/2606; H04B 7/15542; H04B 7/15528; H04B 7/14; H04B 7/15; H04L 2001/0097
USPC .................. 370/315, 328, 336, 311, 281
See application file for complete search history.

(56) References Cited

U.S. PATENT DOCUMENTS

| | | |
|---|---|---|
| 7,710,930 B2 | 5/2010 | Kwak |
| 7,742,390 B2 | 6/2010 | Mujtaba |
| 8,036,241 B2 | 10/2011 | Ji et al. |
| 8,045,574 B2 | 10/2011 | Sherman et al. |
| 8,121,108 B2 | 2/2012 | Kwon et al. |
| 8,144,647 B2 | 3/2012 | Nabar et al. |
| 8,155,138 B2 | 4/2012 | van Nee |
| 8,265,061 B1 | 9/2012 | Smith et al. |
| 8,289,869 B2 | 10/2012 | Sawai |
| 8,355,389 B2 | 1/2013 | Kasslin et al. |
| 8,411,699 B2 | 4/2013 | Ohmi |
| 8,468,615 B2 | 6/2013 | Tremp |
| 8,526,351 B2 | 9/2013 | Fischer et al. |
| 8,619,907 B2 | 12/2013 | Mujtaba et al. |
| 8,724,720 B2 | 5/2014 | Srinivasa et al. |
| 8,867,653 B2 | 10/2014 | Zhang et al. |
| 8,995,367 B2 | 3/2015 | Liu |
| 2003/0012163 A1 | 1/2003 | Cafarelli et al. |
| 2004/0203979 A1 | 10/2004 | Attar et al. |
| 2004/0218555 A1 | 11/2004 | Chen et al. |
| 2005/0047386 A1 | 3/2005 | Yi |
| 2005/0105504 A1 | 5/2005 | Sakoda |
| 2006/0187964 A1 | 8/2006 | Li et al. |
| 2007/0025244 A1 | 2/2007 | Ayyagari et al. |
| 2007/0041353 A1 | 2/2007 | Li et al. |
| 2007/0076675 A1 | 4/2007 | Chen |
| 2007/0160021 A1 | 7/2007 | Xhafa et al. |
| 2007/0217378 A1 | 9/2007 | Moorti et al. |
| 2007/0280246 A1 | 12/2007 | Berkman et al. |
| 2007/0286222 A1 | 12/2007 | Balasubramanian |
| 2008/0002641 A1 | 1/2008 | Hong et al. |
| 2008/0144558 A1 | 6/2008 | Wentink |
| 2008/0146253 A1 | 6/2008 | Wentink |
| 2008/0151814 A1 | 6/2008 | Jokela |
| 2008/0219196 A1 | 9/2008 | Ptasinski |
| 2008/0240049 A1 | 10/2008 | Gaur |
| 2008/0247376 A1 | 10/2008 | Del Prado Pavon et al. |
| 2008/0310391 A1 | 12/2008 | Schneidman et al. |
| 2009/0010191 A1 | 1/2009 | Wentink |
| 2009/0016306 A1 | 1/2009 | Wang et al. |
| 2009/0052362 A1 | 2/2009 | Meier et al. |
| 2009/0109887 A1 | 4/2009 | Chandra et al. |
| 2009/0196163 A1 | 8/2009 | Du |
| 2009/0196211 A1 | 8/2009 | Wentink |
| 2009/0196212 A1 | 8/2009 | Wentink |
| 2009/0219847 A1 | 9/2009 | Fischer |
| 2009/0279474 A1* | 11/2009 | Chou ............ H04B 7/155 370/315 |
| 2010/0142417 A1* | 6/2010 | Kim ............ H04B 7/15557 370/281 |
| 2010/0165973 A1 | 7/2010 | Su et al. |
| 2010/0192001 A1 | 7/2010 | Cornwall et al. |
| 2010/0278088 A1 | 11/2010 | Goldman |
| 2010/0284316 A1 | 11/2010 | Sampathkumar |
| 2010/0309831 A1 | 12/2010 | Yeh et al. |
| 2010/0315999 A1 | 12/2010 | Kakani et al. |
| 2011/0002219 A1 | 1/2011 | Kim et al. |
| 2011/0026446 A1 | 2/2011 | Stacey |
| 2011/0122780 A1 | 5/2011 | Nieminen et al. |
| 2011/0176521 A1 | 7/2011 | Park et al. |
| 2011/0268054 A1 | 11/2011 | Abraham et al. |
| 2012/0106418 A1 | 5/2012 | Xhafa et al. |
| 2012/0120858 A1 | 5/2012 | Das et al. |
| 2012/0147800 A1 | 6/2012 | Park et al. |
| 2012/0159001 A1 | 6/2012 | Liu et al. |
| 2012/0201316 A1 | 8/2012 | Zhang et al. |
| 2012/0219099 A1 | 8/2012 | Loukianov |
| 2012/0263084 A1 | 10/2012 | Liu et al. |
| 2012/0263085 A1 | 10/2012 | Liu et al. |
| 2012/0263086 A1 | 10/2012 | Liu et al. |
| 2012/0263094 A1 | 10/2012 | Wentink |
| 2012/0302184 A1 | 11/2012 | Zaitsu |
| 2012/0315943 A1 | 12/2012 | Chu et al. |
| 2013/0016648 A1* | 1/2013 | Koskela ............ H04W 92/20 370/315 |
| 2013/0114506 A1* | 5/2013 | Cai et al. ............ 370/328 |
| 2013/0176902 A1 | 7/2013 | Wentink et al. |
| 2013/0230028 A1* | 9/2013 | Calcev et al. ............ 370/336 |
| 2013/0235792 A1* | 9/2013 | Abraham ............ H04W 76/02 370/315 |
| 2013/0258931 A1 | 10/2013 | Gonikberg et al. |
| 2014/0119268 A1 | 5/2014 | Chu et al. |
| 2014/0153463 A1 | 6/2014 | Park et al. |
| 2014/0153469 A1* | 6/2014 | Park ............ H04W 52/0216 370/311 |

FOREIGN PATENT DOCUMENTS

| | | |
|---|---|---|
| EP | 1777877 A2 | 4/2007 |
| WO | WO-2008111496 A2 | 9/2008 |
| WO | WO-2010/002100 A2 | 1/2010 |
| WO | WO-2012122119 A1 | 9/2012 |

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 1232 pages, (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Hiqh-Speed Physical Laver in the 5 GHZ Band," The Institute of Electrical and Electronics Engineers, Inc., 91 pages, (1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., 359 pages, (Jan. 2012).

IEEE Std 802.11b-1999/Cor 1-2001 (Corrigendum to IEEE Std 802.11 b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band Corrigendum 1," The Institute of Electrical and Electronics Engineers, Inc., 23 pages, (Nov. 7, 2001).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium (56) References Cited

OTHER PUBLICATIONS

Access Control (MAC) and Physical Layer (PHY) specifications: Further Higher Data Rate Extension in the 2.4 GHz Band," The Institute of Electrical and Electronics Engineers, Inc., 69 pages, (Apr. 2003).
Park, Minyoung, "IEEE P802.11 Wireless LANs Proposed Specification Framework for TGah," IEEE 802.11-11/1137r6, 13 pages, (Mar. 2012).
Notification of Transmittal of the International Search Report and the Written Opinion of the International Searching Authority, or the Declaration dated Jan. 28, 2014 in reference to PCT/US2013/043593 (10 pages).
U.S. Appl. No. 13/680,831, Liu.
U.S. Appl. No. 13/680,876, Liu.
Stacey et al., "IEEE P802.11, Wireless LANs, Proposed TGac Draft Amendment," Institute of Electrical and Electronics Engineers, doc. No. IEEE 802.11-10/1361 r3 (Jan. 2011).
Chen, "Home Network Basis: Transmission Environments and Wired/Wireless Protocols," Prentice Hall (Jul. 2003).
Stacey et al., "Specification Framework for TGac," document No. IEEE 802.11-09/0992r20, Institute for Electrical and Electronics Engineers, pp. 1-49, Jan. 18, 2011.
Hiertz, et al., "The IEEE 802.11 Universe," IEEE Communications Magazine, pp. 62-70, Jan. 2010.
Perahia, et al., "Gigabit Wireless LANs: an overview of IEEE 802.11 ac and 80211 ad," ACM SIGMOBILE Mobile Computing and Communications Review, vo. 15, No. 3, pp. 23-33, Jul. 2011.
IEEE P802.11af™/D1.05 Draft Standard for Information Technology Telecommunications and information exchange between systems—Local and metropolitan area networks—Specific requirements Part 11: Wireless LAN Medium Access Control (MAC) and Physical Layer (PHY) specifications, Amendment 4: TV White Spaces Operation, 802.11 Working Group of the 802 Committee, Nov. 2011, 123 pages.
Yu, et al. "Coverage extension for IEEE802.11 ah," The Institute of Electrical and Electronics Engineers, doc. No. IEEE 802.11-11/0035r1, (Jan. 2011).
Taghavi et al., "Introductory Submission for TGah", doc. No. IEEE 802.11-11/0062r0, Institute for Electrical and Electronics Engineers, pp. 1-5 (Jan. 14, 2011).
Zhang et al., "11ah Data Transmission Flow," The Institute of Electrical and Electronics Engineers, doc. No. IEEE 802.11-11/1484r1, (Nov. 2011); 15 Pages.
Vermani, et al. "Preamble Format for 1 MHz," The Institute of Electrical and Electronics Engineers, doc. No. IEEE 802.11-11/1482r2, (Nov. 2011).
Zhang et al., "1 MHz Waveform in Wider BW", The Institute of Electrical and Electronics Engineers, doc. No. IEEE 802.11-12/0309r1, (Mar. 2012).
Vermani, et al. "Spec Framework Text for PHY Numerology," The Institute of Electrical and Electronics Engineers, doc. No. IEEE 802.11-11/1311 rO, (Sep. 2011).
International Search Report and Written Opinion in International Application No. PCT/US2012/034091 dated Nov. 27, 2012.
IEEE Std. 802.11n "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Enqineers, Inc.*, Oct. 2009.
PCT Internation Search Report and Written Opinon for related Application No. PCT/US2012/066246; Jan. 23, 2013; 5 pages.
Ghosh, Chittabrata et al.; Restricted Access Window Signaling for Uplink Channel Access; Jul. 16, 2012; 13 pages.
Liu, Siyang et al.; DCF Enhancements for Large Number of STAs; Sep. 15, 2011; 11 pages.
Revolution Wi-Fi the Wireless Professional's Connection for Independent Analysis; Wireless QoS Part 1—Background Information; Jul. 28, 2010; 11 pages.

Mangold, Stefan et al.; IEEE 802.11e Wireless LAN for Quality of Service; 2002; 8 pages.
Multi-Rate Layered Decoder Architecture for Block LDPC Codes of the IEEE 802.11n Wireless Standard; Kiran Gunnam, Gwan Choi, Weihuang Wang, and Mark Yeary; © 2007 IEEE. (4 pages).
IEEE Standard for Information technology—Telecommunications and information exchange between systems Local and metropolitan area networks—Specific requirements Part 11: Wireless LAN Medium Access Control (MAC) and Physical Layer (PHY) Specifications; Copyright © 2012 by the Institute of Electrical and Electronics Engineers, Inc.; Mar. 29, 2012; 2793 pages.
International Standard, ISO/IEG 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
PCT International Search Report for related Application No. PCT/US2013/044473; Oct. 29, 2013; 5 pages.
IEEE Std 802.11 af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.
Low Power Capability Support for 802.11ah dated Jan. 17, 2011.
U.S. Appl. No. 61/475,776 dated Apr. 15, 2011.
Zhao, Liqiang et al.; Hybrid DCF Supporting Hybrid Antennas in a WLAN; IMACS Multiconference; Oct. 4-6, 2006.
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.
U.S. Appl. No. 14/875,597, Liu.
Park, Minyoung et al. "802.11ah Channel Access Improvement." IEEE 802.11-11/1230r1, Intel Corp. (May 14, 2012): 11 Pages.
Jafarian, Amin et al. "EDCA Parameters." IEEE 802.11-12/861r0, Qualcomm Inc., (Jul. 16, 2012): 10 Pages.
IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.
802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.
IEEE Std. 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.
"Specification of the Bluetooth System," Master Table of Contents & Compliance Requirements—Covered Core Package version: 4.0; Jun. 30, 2010; 2302 pages.
IEEE P802.11ac/D5.0; Draft Standard for Information Technology—Telecommunications and information exchange between systems—Local and metropolitan area networks—Specific requirements: Part 11: Wireless LAN Medium Access Control (MAC) and Physical Layer (PHY) specifications: Amendment 4: Enhancements for Very High Throughput for Operation in Bands below 6 GHz; Jan. 2013; 440 pages.
IEEE Std. P802.11ad/D5.0; Draft Standard for information technology—Telecommunications and information exchange between systems Local and metropolitan area networks—Specific requirements; Part 11: Wireless LAN Medium Access Control (MAC) and (56) References Cited

OTHER PUBLICATIONS

Physical Layer (PHY) Specifications; Amendment 3: Enhancements for Very High Throughput in the 60 GHz Band; Sep. 2011; 601 pages.
IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 pages.
Office Action in U.S. Appl. No. 13/450,220, dated Oct. 6, 2015 (20 pages).
Notice of Allowance in U.S. Appl. No. 13/450,222, dated Aug. 21, 2015 (9 pages).
Supplemental Notice of Allowability in U.S. Appl. No. 13/450,222, dated Sep. 2, 2015 (3 pages).
Office Action in U.S. Appl. No. 13/450,220, dated Jun. 25, 2014 (18 pages).
Office Action in U.S. Appl. No. 13/450,220, dated Jan. 16, 2015 (17 pages).
Office Action in U.S. Appl. No. 13/450,222, dated Sep. 11, 2014 (19 pages).
Office Action in U.S. Appl. No. 13/450,222, dated Jan. 6, 2015 (21 pages).
IEEE Std 802.11v-2011—IEEE Standard for Information Technology—Telecommunications and information exchange between systems—Local and metropolitan area networks—Specific Requirements—Part 11: Wireless LAN Medium Access Control (MAC) and Physical Layer (PHY) specifications; Amendment 8: IEEE 802.11 Wireless Network Management; Feb. 2011; 407 pages.
IEEE P802.11n: TGn Sync Proposal Technical Specifications; Syed Aon Mujtaba; IEEE 802.11-04/0889r6; May 2005; 131 pages.
Minyoung Park (Intel): "TGah SFD D12.x ; 11-13-0130-00-00ah-tgah-sfd-d12-x", IEEE SA Mentor; 11-13-0130-00-00AH-TGAH-SFD-D12-X, IEEE-SA Mentor, Piscataway, NJ USA, vol. 802.11ah, Jan. 16, 2013 (Jan. 16, 2013), pp. 1-58, XP068040532 [retrieved on Jan. 16, 2013] paragraph [4.4.1.1].
Van Nee, et al. "The 802.11n MIMO-OFDM Standard for Wireless LAN and Beyond," Wireless Personal Communications, vol. 37, pp. 445-453 (Jun. 2006).
IEEE P802.11ac/D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.
Park, "Proposed Specification Framework for TGah", The Institute of Electrical and Electronics Engineers, doc. No. IEEE 802.11-11/1137r6, Mar. 2012.
International Preliminary Patentability Report in corresponding PCT/US2012/034091 mailed Oct. 31, 2013.
IEEE Std. 802.11b-1999 (Supplement to ANSI/IEEE Std. 802.11, 1999 Edition—96 pages) Supplement to IEEE Standard for Information Technology—Telecommunications and information exchange between systems—Local and metropolitan area networks—Specific requirements, Part 11: Wireless LAN Medium Access Control (MAC) and Physical Layer (PHY) specifications:96 Pages.
IEEE P802.11g/D8.2 DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; Apr. 2003, 69 pages.
Gunnam, Kiran, Choi, Gwan, Wang, Weihuang; Mutli-Rate Layered Decoder Architecture for Block LDPC Codes of the IEEE 802.11n Wireless Standard; Department of Electrical and Computer Engineering; 2007; pp. 1645-1648.

* cited by examiner

METHOD AND APPARATUS FOR RELAYING COMMUNICATION BETWEEN AN ACCESS POINT AND A STATION IN A WIRELESS NETWORK

CROSS-REFERENCE TO RELATED APPLICATIONS

This application claims the benefit of U.S. Provisional Application No. 61/657,643, filed on Jun. 8, 2012. The entire disclosure of the application referenced above is incorporated herein by reference.

This application is related to U.S. application Ser. No. 13/450,209, filed Apr. 18, 2012, U.S. application Ser. No. 13/477,575, filed May 22, 2012, and U.S. Provisional Application No. 61/794,292, filed Mar. 15, 2013. The disclosures of the above applications are incorporated herein by reference in their entirety.

FIELD

The present disclosure relates to wireless network communication, and more particularly to network channel access control systems.

BACKGROUND

A network can be formed by an access point and multiple stations (or network devices) in communication with the access point. Communications between the access point and the multiple stations can occur during one or more uplink periods and one or more downlink periods. For example, during an uplink period, a station may transmit data to the access point; and during a downlink period, a station may receive data from the access point. An access point may periodically transmit beacons to inform a station of various communication-related information—including, for example, i) when the access point has data for the stations, ii) when data is to be transmitted from the access point to the stations, and/or iii) when the stations may transmit data to the access point.

Each of the beacons may include a traffic information message (TIM) and/or a delivery traffic information message (DTIM). TIMs are transmitted to the stations to indicate when unicast data, broadcast data, and/or multicast data is buffered to be transmitted from the access point to the stations. A DTIM is a special TIM. DTIMs not only indicate whether an access point has data (e.g., buffered unicast data, multicast data, and/or broadcast data) to be transmitted to a station, DTIMs also indicate that buffered multicast data and/or broadcast data is to be transmitted subsequent to beacons that carry the DTIM. The DTIMs may be transmitted less frequently than the TIMs.

Each station in a network or basic service set (BSS) may "wake" from a power save mode prior to a time when a DTIM is expected to be transmitted from and/or received by an access point. This allows the stations to determine whether the access point is to transmit multicast data or broadcast data for the BSS, a multicast group and/or a broadcast group in which the stations are assigned. Each station in a network may not wake for each transmitted TIM. Each station may wake for assigned TIMs and remain in a power save mode for other TIMs. This allows the stations to remain in a power save mode for increased periods of time. A station that operates according to a power-saving scheme is also referred to herein as a "power saving station".

An access point configured to satisfy traditional Institute of Electrical and Electronics Engineers (IEEE) 802.11 standards may support up to 2007 power saving (PS) stations for a single channel. According to 802.11, a single channel may have a bandwidth of 20 mega-hertz (MHz) or 40 MHz. According to IEEE 802.11ah, a station may have a channel bandwidth of 1 MHz or 2 MHz. IEEE 802.11ah requires that an access point support 6000 or more stations in a single channel. This requirement is introduced for "smart grid" applications. A "smart grid" application refers to an application that includes a network with 6000 or more stations, which are located in residential homes and/or business facilities with associated power meters. Although an increase in the number of stations supported by an access point provides increased network coverage per access point, the increased support can result in increased beacon duration times and/or cause channel congestion and increased channel access delays.

SUMMARY

A network includes an access point, a client station, and a proxy station. The proxy station is configured to communicate with the access point during a first period. During the first period the proxy station is configured to receive, from the access point, downlink data intended for the client station, and transmit, to the access point, uplink data received from the client station and intended for the access point. The proxy station is further configured to communicate with the client station during a second period. During the second period the proxy station is configured to receive, from the client station, the uplink data intended for the access point, and transmit, to the client station, the downlink data intended for the client station.

A method of operating a network including an access point, a client station, and a proxy station includes, using the proxy station, communicating with the access point during a first period. During the first period the proxy station receives, from the access point, downlink data intended for the client station, and transmits, to the access point, uplink data received from the client station and intended for the access point. The method further includes, using the proxy station, communicating with the client station during a second period. During the second period the proxy station receives, from the client station, the uplink data intended for the access point, and transmits, to the client station, the downlink data intended for the client station.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Techniques disclosed herein may be implemented to satisfy IEEE 802.11ah requirements. The techniques may be used to, for example, allow an access point to support 6000 or more stations. In particular, a wireless communication network according to the principles of the present disclosure includes a proxy station. The proxy station relays uplink data (i.e., data communicated from the access point to a client station) and downlink data (i.e., data communicated from a client station to the access point) between the access point and one or more client stations. For example only, the network may include a plurality of proxy stations, each associated with a different group of one or more client stations. Each of the proxy stations relays data between a respective group of client stations and the access point.

Each of the proxy stations may be mobile and/or have a fixed location. For example only, a proxy station in a fixed location may be wired or wireless, while mobile proxy stations are wireless. Accordingly, a wired proxy station in a fixed location may receive power via a wired connection and is not constrained by battery life. In this manner, each proxy station, rather than the access point or the client stations, performs scheduling and/or other tasks, reducing power consumption of the access point in the client stations and optimizing access to the wireless medium.

Figure 1:
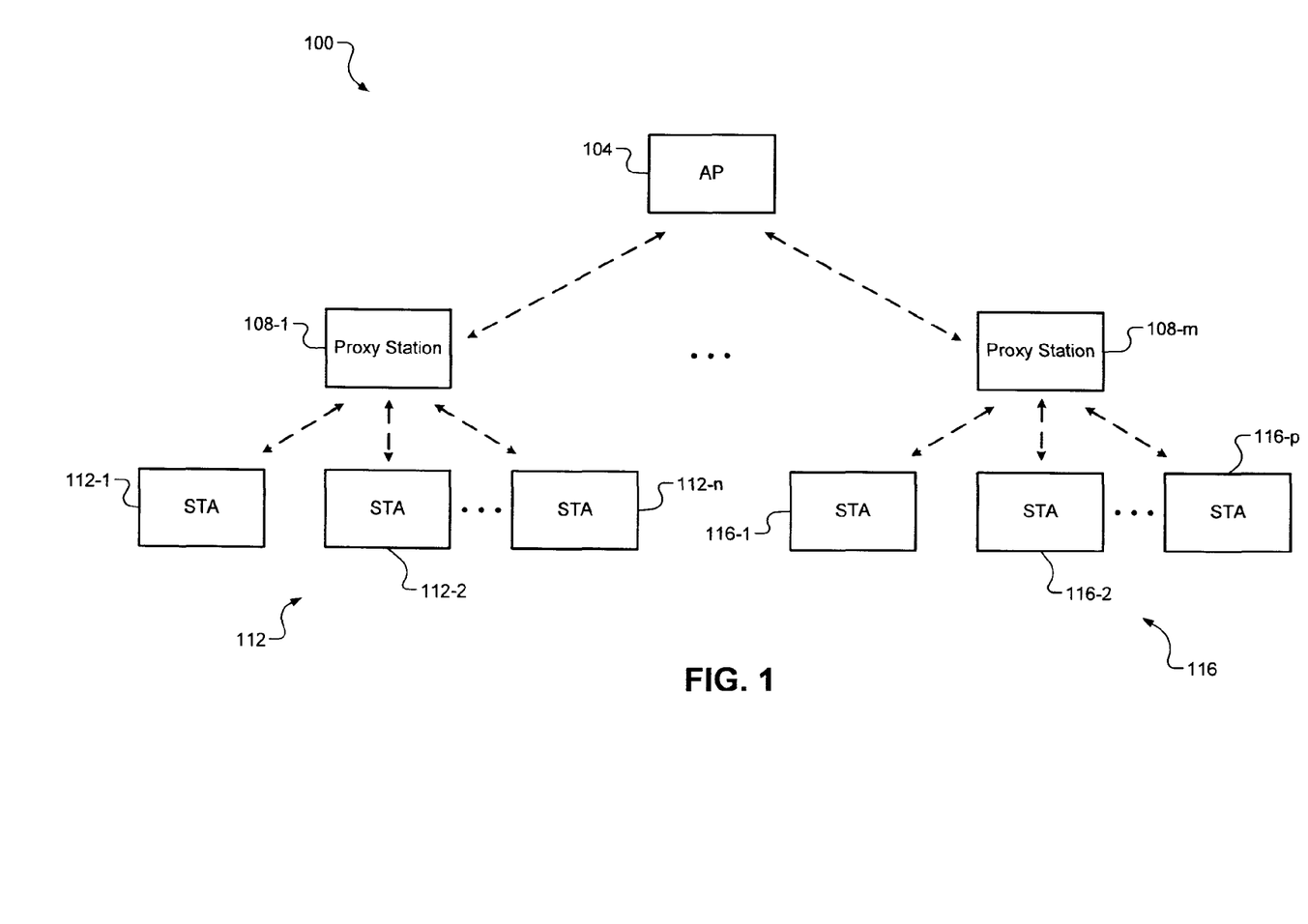
FIG. 1 is an example wireless communication network according to one embodiment of the present disclosure.

FIG. 1 shows a wireless communication network 100 including an access point (AP) 104 and one or more proxy (e.g., relay) stations 108-1 . . . 108-m, referred to collectively as proxy stations 108. The network 100 may be, for example, a wide area network (WAN), a local area network (LAN), or a wireless local area network (WLAN). Each of the proxy stations 108 is associated with a respective group of one or more client stations 112-1, 112-2, . . . , and 112-n (referred to collectively as client stations 112) and 116-1, 116-2, . . . , and 116-p (referred to collectively as client stations 116). For example only, a total number of the client stations 112 and 116 may be in the range of 6,000.

Each of the proxy stations 108 relays uplink data and downlink data between the AP 104 and the client stations 112 and 116. Further, the proxy stations 108 are configured to schedule medium access (e.g., access between the AP 104 and the proxy stations 108, and/or between the proxy stations 108 and the client stations 112 and 116, via one or more wireless communication channels) for respective groups 112 and 116 of the client stations. In this manner, access to the medium is optimized and power consumption of the AP 104 and the client stations 112 and 116 is reduced. For example only, in some implementations the proxy stations 108 manage very low power medium access and short range transmissions with the client stations 112 and 116 using active polling and/or restricted active polling. Medium access between the AP 104 and the proxy stations 108 may include medium/long range transmissions according to contention-based and/or scheduled medium access. Example medium access schemes implemented by the network 100 may include those described in U.S. application Ser. No. 13/450,209, filed Apr. 18, 2012, U.S. application Ser. No. 13/477,575, filed May 22, 2012, and U.S. Provisional Application No. 61/794,292, filed Mar. 15, 2013. The disclosures of the above applications are incorporated herein by reference in their entirety.

Figure 2:
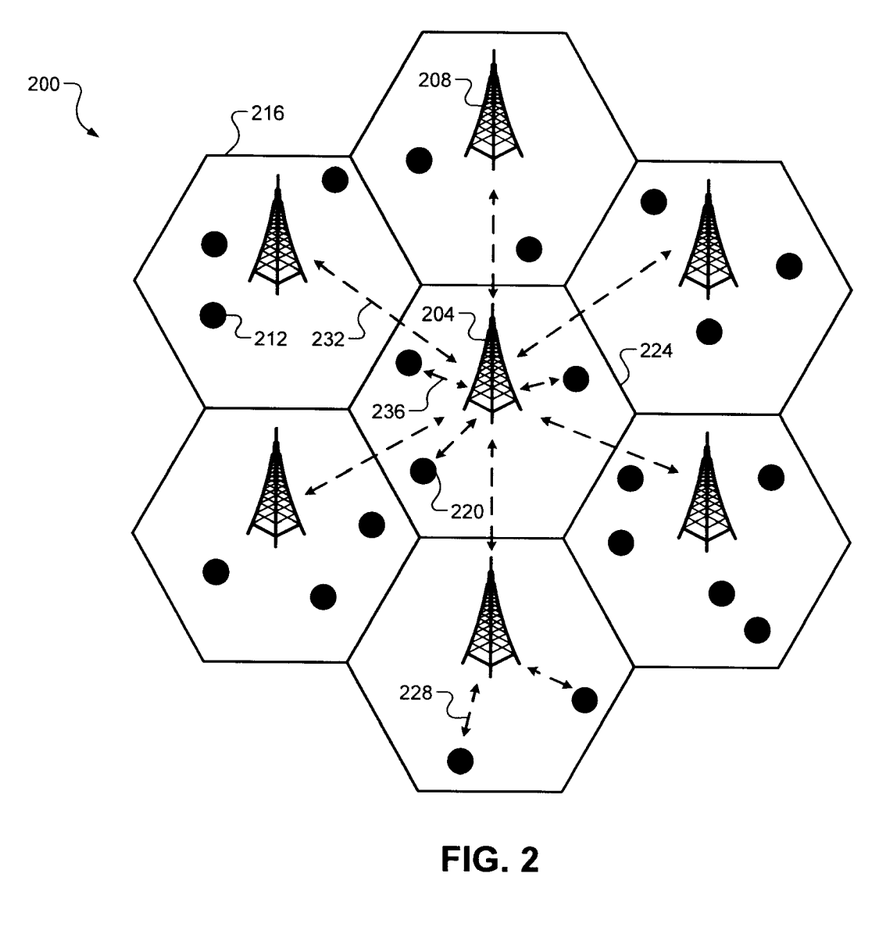
FIG. 2 is another example wireless communication network according to one embodiment of the present disclosure.

FIG. 2 shows an example wireless communication network 200 including an access point (AP) 204, proxy stations 208, and client stations 212. Each of the proxy stations 208 may be located in a different geographical region or cell 216. Each of the stations 212 is associated with one of the proxy stations 208 in a respective one of the cells 216. One or more client stations to 220 may be located in a same cell 224 as the AP 204. Accordingly, the client stations 212 may communicate with the AP 204 via respective proxy stations 208 while the client stations 220 communicate directly with the AP 204.

The client stations 212 communicate with the respective proxy station 208 via a first communication link type 228. The proxy stations 208 communicate with the AP 204 via a second communication link type 232. The client stations 220 communicate with the AP 204 via a third communication link type 236. The first communication link type 228, the second communication link type 232, and the third communication link type 236 may be the same communication link type or be different communication link types. For example, the communication link types 228, 232, and 236 may each be wireless network communication links (e.g., WiFi). Alternatively, one or more of the communication link types may be different. For example, the communication link types 228 and 236 may be wireless network communication links while the communication link type 232 uses another communication protocol such as cellular communication.

When two or more of the communication link types 228, 232, and 236 are the same, same or different communication channels (e.g., frequencies) may be used. For example, the proxy stations 208 may use a first channel for communicating with the AP 204 (e.g., via the second communication link type 232). Conversely, the proxy stations 208 may use a second channel for communicating with the stations 212. Further, proxy stations 208 in different cells 216 may use different channels (e.g., to avoid interference with communication in an adjacent one of the cells 216).

Each of the proxy stations 208 may select a channel for a respective one of the cells 216 based on factors including, but not limited to, local channel conditions and capabilities and/or conditions of the stations 212 in the cell 216, and channels being used by adjacent ones of the cells 216. For example, the proxy stations 208 may perform a scan to select the channel. Each of the proxy stations 208 may select a channel that is not being used in any adjacent cells (e.g., to avoid interference with communication in adjacent cells). However, a proxy station 208 may select a channel that is being used in a non-adjacent one of the cells 216. In other words, one or more channels may be reused.

Each of the client stations 212 establishes a connection with a selected one of the proxy stations 208 or the AP 204 during association. For example, when the client station 212 initially attempts to establish a connection in the network 200, the client station 212 may associate with a nearest one of the proxy stations 208 or the AP 204 based on which of the cells 216 the client station 212 is located in. Further, the client station 212, which may be mobile, may reassociate with a different one of the proxy stations 208 or the AP 204. For example only, the client station 212 may reassociate with a different one of the proxy stations 208 or the AP 204 if the client station 212 moves a predetermined distance away from a current one of the proxy stations 208.

Figure 3:
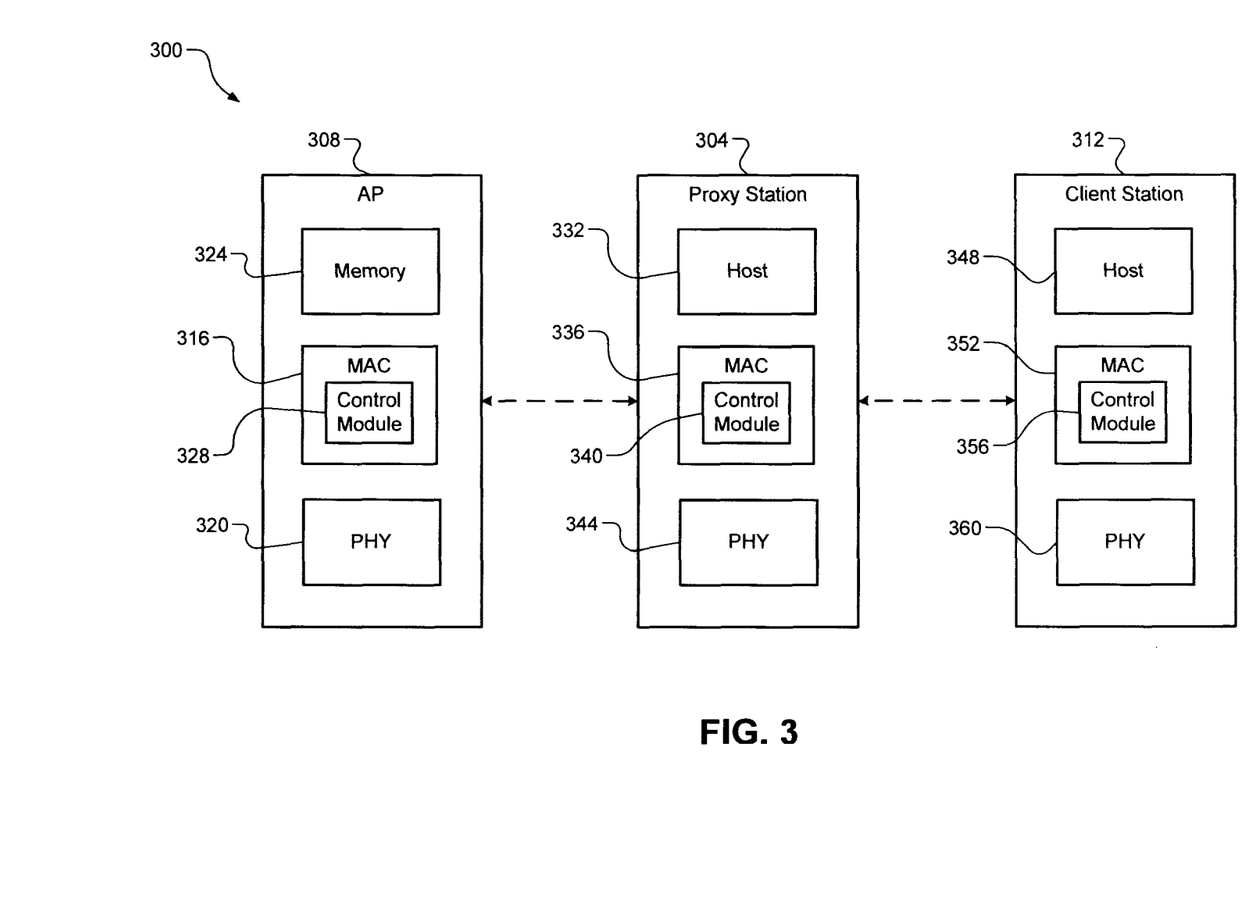
FIG. 3 is an example network including at least one proxy station according to one embodiment of the present disclosure.

FIG. 3 shows an example network 300 including at least one proxy station 304 configured to relay uplink data and downlink data between an AP 308 and a client station 312. The proxy station 304 joins the network 300 as a proxy station. For example, the proxy station 304 establishes itself as a proxy station for a particular cell during association with the AP 308. Once established as a proxy station in the network 300, the proxy station 304 may add one or more client stations 312 to the network 300. For example, the client station 312 may join the network 300 by establishing a connection to the proxy station 304 via association.

The AP 308 includes an AP medium access control (MAC) device 316 and an AP physical layer (PHY) device 320. The AP 308 communicates frames of data (referred to as buffered units (BUs)) via the AP MAC device 316. In one implementation, the data is stored in a memory 324 of the AP 308 and is accessible to the AP MAC device 316. The data can include multicast data, broadcast data, and/or unicast data. Multicast data refers to data that is to be transmitted to two or more of the stations 312. Broadcast data refers to data that is to be transmitted to each station in the network 300. The AP 308 can group the stations 312 into multiple networks, where each network has one or more of the stations 312. Unicast data refers to data that is to be transmitted to a single one of the stations 312. Each of the multicast data, the broadcast data, and the unicast data is transmitted to the stations 312 via the proxy station 304.

The AP MAC device 316 and the AP PHY device 320 may correspond to, for example, layers in an open systems interconnection (OSI) model of a communication system within the AP 308. The AP MAC device 316 includes an AP control module 328. The AP control module 328 generates beacons. Each of the beacons can include a group information message, a traffic information message (TIM) and/or a delivery traffic information message (DTIM). The AP control module 328 can provide the messages in various formats to the stations 312 using techniques disclosed herein.

The proxy station 304 includes a proxy station host 332, a proxy station MAC device 336 with a proxy station control module 340, and a proxy station PHY device 344. The proxy station host 332 can be a proxy station control module, a computer, or other suitable module, which may receive and/or provide frames of data to the proxy station MAC device 336. The proxy station PHY device 344 communicates with the AP PHY device 320 and the client stations 312. The proxy station control module 340, MAC device 336 and/or PHY device 344 may receive a beacon from the AP 304 and relay the beacon to the stations 312, and/or the proxy station 304 may generate and provide a beacon to the stations 312.

The station 312 includes a client station host 348, a client station MAC device 352 with a client station control module 356, and a client station PHY device 360. The client station host 348 can be a client station control module, a computer, or other suitable module, which may receive and/or provide frames of data to the client station MAC device 352. The client station PHY device 360 communicates with the proxy station PHY device 344. In one implementation, the client station control module 356 is configured to operate in an active mode and a standby (or sleep) mode. The client station control module 356 can control which devices of the station 312 are fully powered, partially powered, and/or powered down during the standby mode. During the active mode, the client station control module 356, the client station MAC device 352 and/or the client station PHY device 360 may be fully powered to receive a beacon from the AP 304. During the standby mode, the client station control module 356, the client station MAC device 352 and/or the client station PHY device 360 may be partially or fully powered down.

The client station control module 356 can determine when to operate in the active mode based on previously received beacon information (e.g., received from the proxy station 308). In one implementation, the beacon information indicates to the station 312 whether the proxy station 308 has buffered unicast, multicast, and/or broadcast data (from the AP 304) to transmit to the station 312. The station 312 may transition to the active mode when the station 312 is expected to receive data from the proxy station 308 or when the station 312 has uplink data to transmit to the AP 304 via the proxy station 308.

The proxy station 304 receives downloaded data (i.e., downlink data) intended for the client station 312 from the AP 308, buffers (i.e., caches) the downlink data as necessary, and transmits the downlink data to the client station 312. For example only, the proxy station 304 caches the downlink data when the client station 312 is in a standby mode and relays the downlink data when the client station 312 enters the active mode. Conversely, the proxy station 304 receives uploaded data (i.e., uplink data) intended for the AP 308 from the client station 312, buffers the uplink data as necessary, and transmits the uplink data to the AP 308. For example only, the proxy station 304 receives the uplink data from the client station 312 when the client station 312 is in the active mode and relays the uplink data the AP 308 accordingly.

The proxy station 304, rather than the AP 308, manages the scheduling of access to the AP 308 (e.g., via TIM, DTIM, and/or other management frames). For example, the client station 312 transitions between the active mode and the standby mode and communicates with the proxy station 304 accordingly. In contrast, the proxy station 304 determines when to communicate the uplink data from the client station 312 to the AP 308 and/or communicate the downlink data from the AP 308 to the client station 312. For example only, the proxy station 304 may implement any of the medium access schemes (e.g., medium access scheduling, contention based medium access, etc.) as referenced above in the description of FIG. 1.

In some implementations, the proxy station 304 operates as a transparent proxy station. In other words, the client station 312 is not aware of the proxy station 304. For example, when the proxy station 304 is transparent, the client station 312 associates with the AP 308 and the proxy station 304 does not perform BSS management for communication between the client station 312 and the AP 308. Instead, the proxy station 304 merely communicates all data and/or management frames between the AP 308 and client station 312.

For example, during association, the AP 308 (or the proxy station 304) may indicate to the client station 312 that proxy station 304 will be used to relay data between the client station 312 and the AP 308. For example only, the AP 308 or the proxy station 304 may indicate (e.g., in a beacon or management frame) a MAC and/or IP address and/or other information needed for the client station 312 to communicate with the proxy station 304. In other implementations, the client station 312 may store data (e.g., such as a table) including a list of proxy stations, addresses, and associated locations. If the proxy station 304 provides the beacon, the beacon may be unencrypted in case the client station 312 does not have decryption capability (e.g., the client station 312 does not have the proper decryption key).

In other implementations, the proxy station 304 operates as a nontransparent proxy station. In other words, the client station 312 is aware of the proxy station 304. For example, when the proxy station 304 is nontransparent, the client station 312 associates with the proxy station 304 and the AP 308 does not directly perform BSS management for the client station 312. Instead, the AP 308, for example, transmits a beacon and the proxy station 304 schedules data communication from the client station 312 to the AP 308 according to the beacon. In other words, only data frames are transmitted between the AP 308 to the client station 312. Any management frames for scheduling medium access are generated and transmitted between the proxy station 304 and the client station 312.

A header (e.g., a MAC header) of management and data frames according to one embodiment of the present disclosure includes an optional proxy address field. The proxy address field may include, for example, a MAC address or other address identifier (AID) of the proxy station 304. The AP 308 may assign one or more blocks of an AID to the proxy station 304. For example, the AIDs may indicate addresses of devices usable as proxy stations. One or more of the client stations 312 associated with the proxy station 304 may use a selected one of the AIDs to communicate with the proxy station 304. In some implementations, the AP 308 may set one or more bits in a management frame (e.g., in a TIM indication) to indicate to the proxy station 304 (e.g., by including a block bitmap and/or AID bits corresponding to the proxy station 304) that the AP 308 is buffering downlink data intended for the client station 312.

The header may also include a proxy flag (e.g., a one bit flag) that indicates whether or not the frame is intended for the proxy station 304. For example, if the frame is intended for the proxy station 304, then the proxy flag is set (e.g., is set to 1). Conversely, if the frame is not intended for the proxy station 304 and is instead intended be transmitted directly to the AP 308 or the client station 312, then the proxy flag is not set (e.g., is set to 0). In this manner, the client station 312 may selectively decide whether to communicate directly with the AP 308 or via the proxy station 304 by selectively setting the proxy flag. The proxy address field and the proxy flag may not be included in additional authenticated data (AAD) construction (e.g., message integrity calculation, or MIC).

Figure 4:
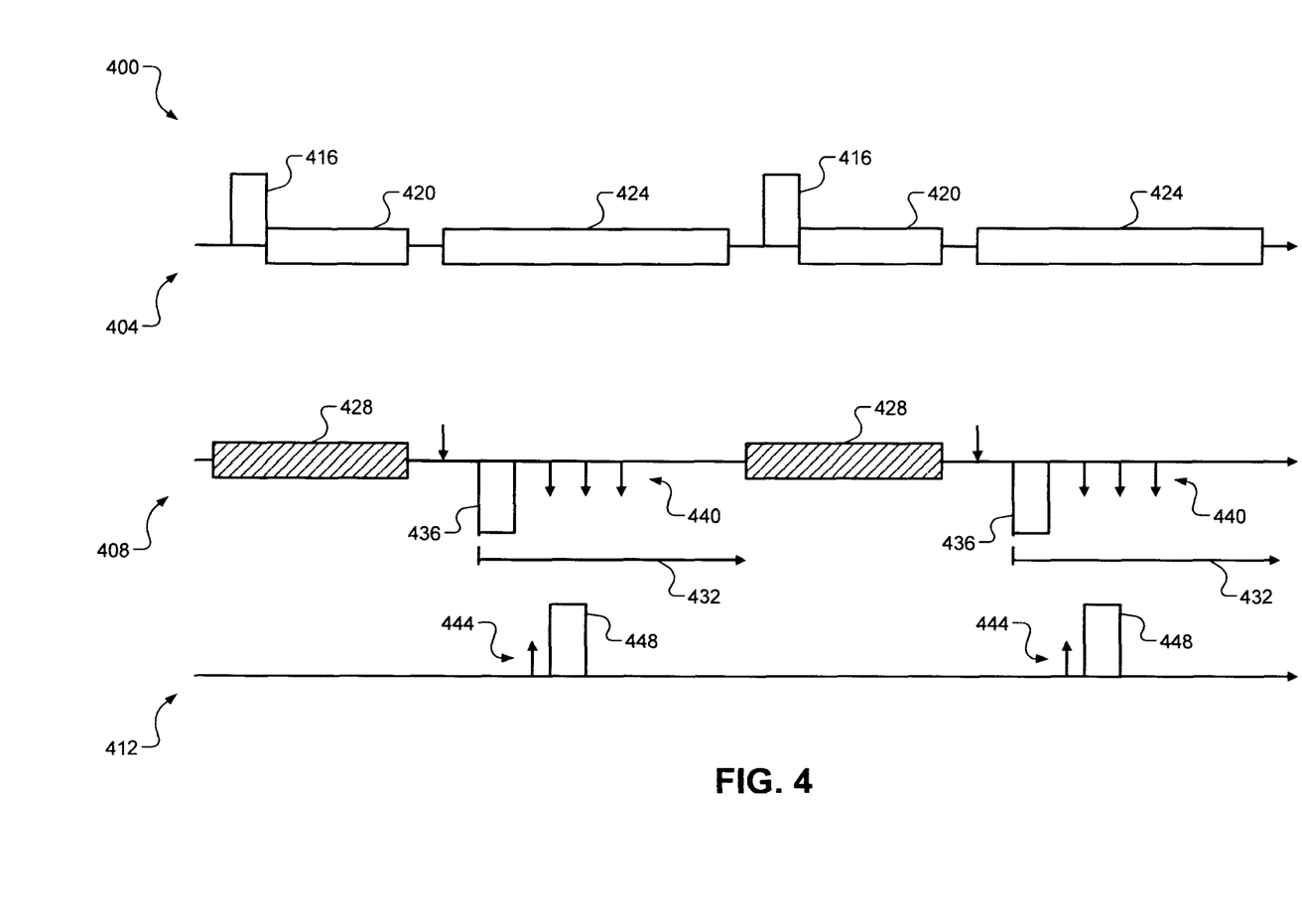
FIG. 4 illustrates example medium access scheduling according to one embodiment of the present disclosure.

FIG. 4 illustrates example medium access scheduling 400 including an AP 404, a proxy station 408, and a client station 412 according to the principles of the present disclosure. The AP 404 schedules communication with the proxy station 408 and other proxy stations or client stations according to a beacon 416. For example, the AP 44 communicates with the proxy station 408 during a first period 420 according to the beacon 416. For example only, the first period 420 may correspond to a scheduled access period or a contention-based access period. The AP 408 communicates with other proxy stations or client stations during one or more second periods 424.

During the first period, the proxy station 408 transmits uplink data (e.g., data received from the client station 412 and cached at the proxy station 408) to the AP 408 and receives downlink data intended for the client station 412 from the AP 408. For example, the proxy station 408 tracks the beacon 416 from the AP 404. In response to the beacon 416, the proxy station 408 communicates with the AP 404 and blacks out communication with the client station 412 (e.g., during a blackout period 428). For example only, the blackout period 428 may begin prior to receiving the beacon 416 to prevent interference from communication with the client station 412. Communication between the proxy station 408 and the AP 404 may be scheduled according to beacons, TIMs, contention-based medium access, and/or other time division or frequency division-based scheduling schemes.

During the blackout period 428 the proxy station 408 may transition between a first channel (e.g., a channel used to communicate with the client station 412) and a second channel (e.g., a channel used to communicate with the AP 404) if the proxy station 408 communicates with the AP 404 and client station 412 using different channels and does not have the capability of communicating using both channels at the same time. For example, prior to switching from the first channel to the second channel and initiating the blackout period 428, the proxy station 408 may inform the client station 412 of the switch to prevent the client station 412 from attempting to communicate with the proxy station 408 during the blackout period 428. In other implementations, if the proxy station 408 communicates with the AP 404 and client station 412 using the same channel, the proxy station 408 may inform the client station 412 of the blackout period 428 to prevent the client station 412 from attempting to communicate with the proxy station 408. In this manner, interference caused by communication with the client station 412 is avoided while the proxy station 408 is communicating with the AP 404.

After the blackout period 428 and prior to a next one of the beacons 416, the proxy station 408 communicates with the client station 412. The AP 404 may consider the proxy station 408 to be in a sleep or standby mode while the AP 404 communicates with other stations during the second period 424. For example, the AP 404 may set a power save bit corresponding to the proxy station 408 that indicates that the proxy station 408 is not able to receive data. Accordingly, when the power save bit is set, the AP 404 caches any downlink data intended for the proxy station 408 (i.e., including data intended for the client station 412). Subsequent to a next one of the beacons 416, the AP 404 transmits the data to the proxy station 408 (e.g., during a next one of the blackout periods 428).

The proxy station 408 communicates with the client station 412 in an access period 432. For example, if the proxy station 408 uses different channels for communicating with the AP 404 and the client station 412, the proxy station 408 may switch back to the first channel from the second channel for communication with the client station 412 prior to the access period 432. For example only, the proxy station 408 may switch to the first channel an amount of time prior to the access periods 432 to compensate for any clock drift. The proxy station 408 may transmit a beacon 436 to the client station 412 to indicate a beginning of the access period 432. The proxy station 408 transmits downlink data 440 to the client station 412 during the access period 432. Conversely, the client station 412 transmits uplink data 444 to the proxy station 408 during the access period 432. In some implementations, the client station 412 is configured to transmit a poll 448 (i.e., an inquiry) to the proxy station 408 to determine whether the proxy station 408 has any cached downlink data for the client station 412.

Although the first period 420 and the access period 432 are shown as non-overlapping, in some implementations the first period 420 and the access period 432 may overlap. For example, the proxy station 408 may be configured to communicate with the AP 404 using a first channel while communicating with the client station 412 using a second channel.

The proxy station 408 schedules and/or reserves the blackout periods 428 to schedule communication with the AP 404. Similarly, the proxy station 408 schedules the access periods 432 to schedule communication with the client station 412. For example, the proxy station 408 informs the client station 412 of timing of the blackout periods 428, including beginning and end times and durations of the blackout periods 428. Further, the proxy station 408 informs the client station 412 of timing of the access periods 432, including beginning and end times and durations of the access periods 432. The proxy station 408 also informs the client station 412 of a wake-up time and wake-up interval of the client station 412 during the access period 432. In other words, if the proxy station 408 is associated with multiple client stations 412, each of the client stations 412 may be assigned a different wake-up time and/or different wake-up interval. Accordingly, each client station 412 does not need to track a beacon from the proxy station 408 and instead only needs to wake up at a corresponding wake-up time within the access period 432 to transmit uplink data and receive downlink data.

Figure 5:
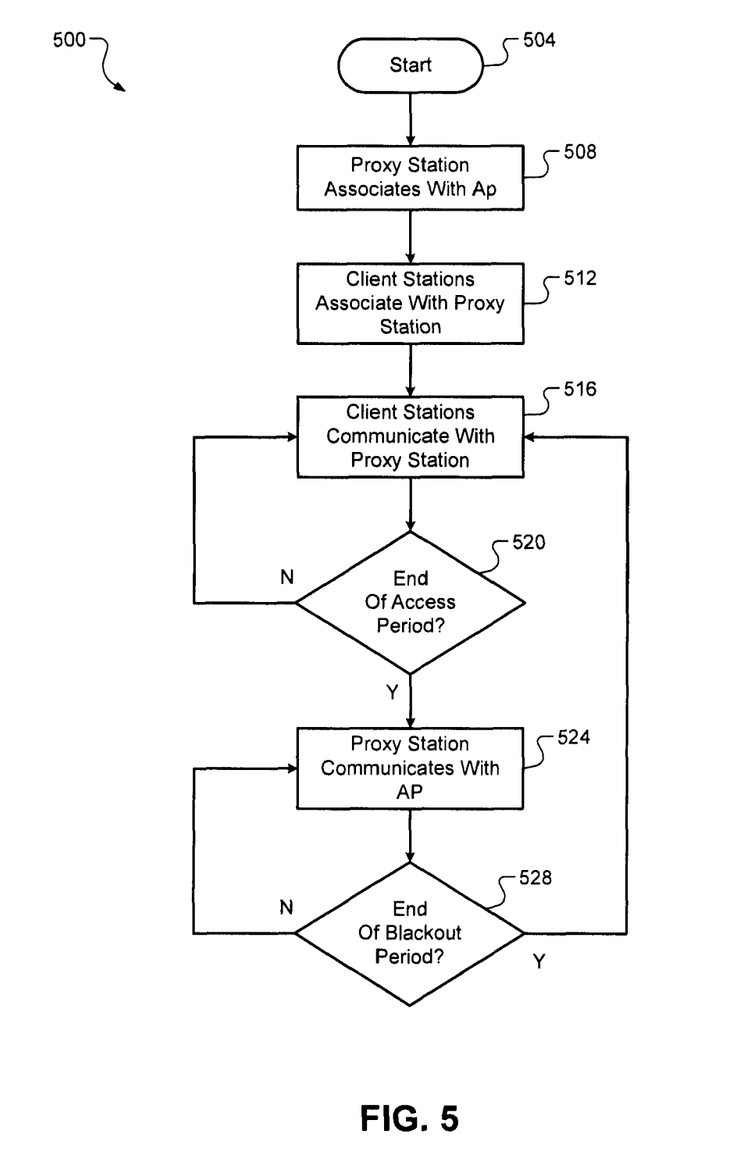
FIG. 5 illustrates steps of an example proxy station operating method according to one embodiment of the present disclosure.

FIG. 5 shows an example proxy station operating method 500 beginning at 504. At 508, a proxy station associates with an AP. At 512, one or more client stations associate with the proxy station. At 516, the client stations communicate with the proxy station during an access period to receive downlink data from the proxy station and transmit uplink data to the proxy station. At 520, the method 500 determines whether the access period is expired. If true the method 500 continues to 524. If false, the method 500 continues to 516. At 524, the proxy station communicates with the AP during a blackout period to transmit uplink data to the AP and receive downlink data intended for the client station from the AP. At 528, the method 500 determines whether the blackout period is expired. If true, the method 500 continues to 516. If false, the method 500 continues to 524.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

Further aspects of the present invention relate to one or more of the following clauses. A network includes an access point, a client station, and a proxy station. The proxy station is configured to communicate with the access point during a first period. During the first period the proxy station is configured to receive, from the access point, downlink data intended for the client station, and transmit, to the access point, uplink data received from the client station and intended for the access point. The proxy station is further configured to communicate with the client station during a second period. During the second period the proxy station is configured to receive, from the client station, the uplink data intended for the access point, and transmit, to the client station, the downlink data intended for the client station.

In some implementations, the proxy station is configured to, prior to the first period, instruct the client station not to communicate during the first period. The proxy station is configured to, prior to the first period, transition from a first channel to a second channel, and the proxy station is configured to communicate with the client station using the first channel, and communicate with the access point using the second channel. The proxy station is configured to receive a beacon from the access point during the first period.

In other implementations, the proxy station is configured to store the downlink data intended for the client station during the first period. The proxy station is configured to store the uplink data intended for the access point during the second period. The client station is configured to poll the proxy station for the downlink data during the second period. The proxy station is configured to store the uplink data intended for the access point during the second period. The uplink data and the downlink data include one or more frames of data, each of the frames of data including an identifier of the proxy station. The uplink data includes one or more frames of data, and each of the frames of data includes an indication of whether the uplink data is intended for the proxy station.

A method of operating a network including an access point, a client station, and a proxy station includes, using the proxy station, communicating with the access point during a first period. During the first period the proxy station receives, from the access point, downlink data intended for the client station, and transmits, to the access point, uplink data received from the client station and intended for the access point. The method further includes, using the proxy station, communicating with the client station during a second period. During the second period the proxy station receives, from the client station, the uplink data intended for the access point, and transmits, to the client station, the downlink data intended for the client station.

In some implementations the method includes, using the proxy station prior to the first period, instructing the client station not to communicate during the first period. The method includes, using the proxy station prior to the first period, transitioning from a first channel to a second channel, communicating with the client station using the first channel and communicating with the access point using the second channel. The method includes, using the proxy station, receiving a beacon from the access point during the first period.

In other implementations, the method includes, using the proxy station, storing the downlink data intended for the client station during the first period. The method includes, using the proxy station, storing the uplink data intended for the access point during the second period. The method includes, using the client station, polling the proxy station for the downlink data during the second period. The method includes, using the proxy station, storing the uplink data intended for the access point during the second period. The uplink data and the downlink data include one or more frames of data, each of the frames of data including an identifier of the proxy station. The uplink data includes one or more frames of data, wherein each of the frames of data includes an indication of whether the uplink data is intended for the proxy station.

What is claimed is:

1. A network, the network comprising:
  a proxy station configured to
    communicate with an access point during a first period, wherein during the first period the proxy station is configured to i) receive, from the access point via a communication medium, downlink data intended for a first client station, ii) transmit, to the access point via the communication medium, uplink data received from the first client station and intended for the access point, and iii) prevent any of a plurality of client stations from accessing the communication medium during the first period,
    control scheduling of access to the access point via the communication medium for the first client station from among the plurality of client stations,
      wherein controlling the scheduling of access includes (i) determining a second period that the first client station is permitted to access the communication medium and (ii) preventing other client stations from accessing the communication medium during the second period, and
      wherein, while the proxy station Is controlling the scheduling of access, (i) the access point does not generate management frames related to the scheduling of access and only data frames are transmitted between the access point and the plurality of client stations, and (ii) any management frames for the scheduling of access are generated and transmitted by the proxy station, and
    communicate with the first client station during the second period according to the access scheduled by the proxy station, wherein during the second period the proxy station is configured to i) receive, from the first client station via the communication medium, the uplink data intended for the access point, and ii) transmit, to the first client station via the communication medium, the downlink data intended for the first client station,
      wherein the access point does not communicate with the proxy station during the second period.

2. The network of claim 1, wherein the proxy station is configured to, prior to the first period, instruct the first client station not to communicate during the first period.

3. The network of claim 1, wherein the proxy station is configured to, prior to the first period, transition from a first channel to a second channel, and wherein the proxy station is configured to i) communicate with the first client station using the first channel, and ii) communicate with the access point using the second channel.

4. The network of claim 1, wherein the proxy station is configured to receive a beacon from the access point during the first period.

5. The network of claim 1, wherein the proxy station is configured to store the downlink data intended for the first client station during the first period.

6. The network of claim 1, wherein the proxy station is configured to store the uplink data Intended for the access point during the second period.

7. The network of claim 1, wherein the first client station is configured to poll the proxy station for the downlink data during the second period.

8. The network of claim 1, wherein the uplink data and the downlink data include one or more frames of data, each of the frames of data Including an identifier of the proxy station.

9. The network of claim 1, wherein the uplink data Includes one or more frames of data, wherein each of the frames of data Includes an Indication of whether the uplink data is Intended for the proxy station.

10. A method of operating a network, the method comprising:
  using the proxy station,
    communicating with an access point during a first period, wherein during the first period the proxy station i) receives, from the access point via a communication medium, downlink data intended for a first client station of a plurality of client stations, and ii) transmits, to the access point via the communication medium, uplink data received from the first client station and intended for the access point, and III) prevents any of a plurality of client stations from accessing the communication medium during the first period,
  controlling scheduling of access to the access point via the communication medium for the first client station from among the plurality of client stations,
    wherein controlling the scheduling of access includes (i) determining a second period that the first client station is permitted to access the communication medium and (ii) preventing other client stations from accessing the communication medium during the second period, and wherein, while the proxy station is controlling the scheduling of access, (i) the access point does not generate management frames related to the scheduling of access and only data frames are transmitted between the access point and the plurality of client stations, and (ii) any management frames for the scheduling of access are generated and transmitted by the proxy station, and communicating with the first client station during a second period according to the access scheduled by the proxy station, wherein during the second period the proxy station i) receives, from the first client station via the communication medium, the uplink data intended for the access point, and II) transmits, to the first client station via the communication medium, the downlink data Intended for the first client station, wherein the access point does not communicate with the proxy station during the second period.

11. The method of claim 10, further comprising, using the proxy station prior to the first period, Instructing the first client station not to communicate during the first period.

12. The method of claim 10, further comprising, using the proxy station prior to the first period:

transitioning from a first channel to a second channel;

communicating with the client station using the first channel; and communicating with the access point using the second channel.

13. The method of claim 10, further comprising, using the proxy station, receiving a beacon from the access point during the first period.

14. The method of claim 10, further comprising, using the proxy station, storing the downlink data intended for the first client station during the first period.

15. The method of claim 10, further comprising, using the proxy station, storing the uplink data Intended for the access point during the second period.

16. The method of claim 10, further comprising, using the first client station, polling the proxy station for the downlink data during the second period.

17. The method of claim 10, wherein the uplink data and the downlink data include one or more frames of data, each of the frames of data including an Identifier of the proxy station.

18. The method of claim 10, wherein the uplink data includes one or more frames of data, wherein each of the frames of data includes an Indication of whether the uplink data is Intended for the proxy station.

* * * * *